UNITED STATES PATENT OFFICE.

PAUL JULIUS, OF LUDWIGSHAFEN, GERMANY, ASSIGNOR TO BADISCHE ANILIN & SODA FABRIK, OF SAME PLACE.

DISAZO DYE.

SPECIFICATION forming part of Letters Patent No. 677,228, dated June 25, 1901.

Application filed February 21, 1901. Serial No. 48,336. (Specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria and Empire of Germany, have invented new and useful Improvements in Disazo Dyes, of which the following is a specification.

If the nitro-amido-phenol sulfo-acid to which the constitution

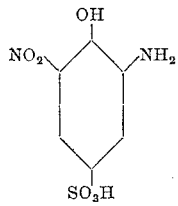

is attributed—that is, the para sulfo-acid of the ortho-nitro-ortho-amido-phenol (see Letters Patent granted to me, No. 644,234, dated 27th of February, 1900)—be reduced, the corresponding diamido-phenol sulfo-acid is obtained. Upon diazotizing this diamido-phenol sulfo-acid a tetrazo compound results, and I have discovered that this tetrazo compound upon combination first with one of the components hereinafter set forth and then with a second of such components new mixed or unsymmetrical disazo coloring-matters are obtained possessing excellent qualities. The said components are beta-naphthol, 2.6 beta-naphthol-mono-sulfo-acid, 2.3.6 beta-naphthol-disulfo-acid, 1.8.4. amido-naphthol-sulfo-acid, and the like. The coloring-matters so obtained dye wool from the acid-bath, giving shades which vary from bluish violet to greenish blue, and upon treating the dyed goods with potassium bichromate violet shades become bluer and greenish shades become greener, while all become more intense and assume a great fastness against the action of milling, washing, and light. Further, the shades so obtained do not suffer when the goods are steamed or carbonized.

In the present application I do not desire to claim my new mixed disazo coloring-matter that can be obtained as above defined generically, for the said coloring-matter is generically claimed in a separate application for Letters Patent, Serial No. 48,335, filed February 21, 1901; but what I wish to claim in this application is the specific mixed disazo coloring-matter which can be obtained from one molecular proportion of the ortho-diamido-phenol-para sulfo-acid and one molecular proportion each of 2.6 naphthol mono-sulfo-acid and beta-naphthol.

Although I do not claim the process for the production of the diamido-phenol-sulfo-acid, I give the following example of a method by which it may be obtained for the sake of clearness, the parts being by weight:

Example 1: Dissolve about four hundred and sixty-eight (468) parts of ortho-nitro-ortho-amido-phenol-para-sulfo-acid in two thousand (2,000) parts of hot water. Stir the solution and slowly add about seven hundred and fifty (750) parts of zinc-dust, and subsequently, in small portions at a time, about two thousand (2,000) parts of hydrochloric acid (containing about thirty-two (32) per cent. of real HCl.) Allow the solution to cool, collect the precipitate, and redissolve it in hydrochloric acid. Filter the solution and neutralize it exactly with carbonate of soda. The desired diamido-phenol sulfo-acid separates out as free acid in the form of a slightly yellowish crystalline precipitate. Collect by filtering, wash with cold water, and dry carefully.

The following example will serve to illustrate the manner in which my invention can be carried into practical effect and new coloring-matter obtained, the parts being by weight:

Example 2: Prepare a solution of about two hundred and four (204) parts of the diamido-phenol-para sulfo-acid obtained as described in the foregoing example in three thousand (3,000) parts of water containing four hundred and sixty (460) parts of hydrochloric acid, (containing thirty-two per cent. of HCl.) To this solution when cold add gradually one hundred and thirty-eight (138) parts of sodium nitrite dissolved in four hundred (400) parts of water. The tetrazo compound is soon formed and partially separates out. Run the solution or suspension of the tetrazo compound thus obtained into a solution of two hundred and forty-seven (247) parts of the sodium salt of 2.6 naphthol-mono-sulfo-acid in three thousand (3,000) parts of water containing also dissolved in it about three hundred (300) parts of crystallized sodium acetate. Stir the mixed solution for about two (2) hours while maintaining their temperature at about forty (40°) degrees centigrade. The intermediate product obtained separates out to a great extent, so that a red paste is obtained. To this add sufficient carbonate of soda to render it alkaline, and then add a solution of one hundred and forty-four (144) parts of beta-naphthol in seven hundred (700) parts of water and one hundred and twenty (120) parts of caustic-soda lye, (containing about thirty-five per cent of NaOH.) Stir the mixture thus obtained again for about two (2) hours at a temperature between forty (40°) and fifty (50°) degrees centigrade. The desired coloring-matter is soon formed and may in part separate out. Boil the mixture and precipitate the coloring-matter from the boiling solution with common salt.

My new coloring-matter thus obtained is soluble in water, giving a green-blue solution, which upon the addition of a little carbonate-of-soda solution becomes bluer in shade, and upon the addition of a little caustic-soda solution turns violet. If hydrochloric acid be added to the aqueous solution, it turns red, and the solution of the coloring-matter in concentrated sulfuric acid is red. The coloring-matter can readily be reduced—for instance, with stannous chlorid in hydrochloric-acid solution, with zinc-dust, or other reducing agents. When suitably reduced, the three reduction products—the diamido-phenol sulfo-acid, amido-naphthol sulfo-acid, and amido-naphthol—are produced and can be recognized.

Now what I claim is—

The new disazo coloring-matter which can be obtained from diamido-phenol-sulfo-acid, 2.6 naphthol sulfo-acid, and beta-naphthol, which is soluble in water giving a green-blue solution which turns bluer upon the addition of sodium-carbonate solution, violet upon the addition of caustic-soda solution, and red upon the addition of hydrochloric acid and gives a red solution in concentrated sulfuric acid, and which upon suitable reduction yields diamido-phenol-sulfo-acid, amido-naphthol-sulfo-acid, and amido-naphthol, substantially as described.

In testimony whereof I have hereunto set my hand in the presence of two subscribing witnesses.

PAUL JULIUS.

Witnesses:
ERNEST F. EHRHARDT,
JACOB ADRIAN.